United States Patent [19]
Howard

[11] Patent Number: 5,234,676
[45] Date of Patent: Aug. 10, 1993

[54] METHOD FOR AQUEOUS PROCESSING OF ALN AND COMPOSITIONS THEREFROM

[75] Inventor: Kevin E. Howard, Midland, Mich.

[73] Assignee: The Dow Chemical Company, Midland, Mich.

[21] Appl. No.: 869,601

[22] Filed: Apr. 16, 1992

[51] Int. Cl.$^5$ .................. B01J 13/00; C01B 21/072; C04B 35/58

[52] U.S. Cl. ................. 423/412; 252/313.1; 501/96

[58] Field of Search ............ 423/412; 252/313.1; 501/96

[56] References Cited

U.S. PATENT DOCUMENTS

| | | |
|---|---|---|
| 2,943,928 | 7/1960 | Guth . |
| 3,709,723 | 1/1973 | Watanabe et al. . |
| 3,738,863 | 6/1973 | Sugaika et al. . |
| 4,923,689 | 5/1990 | Uenishi et al. ............ 423/412 |

FOREIGN PATENT DOCUMENTS

| | | |
|---|---|---|
| 3933976 | 4/1990 | Denmark . |
| 7412566 | 7/1970 | Japan . |

OTHER PUBLICATIONS

114:233766; Ito et al, published 1991 (Chemical Abstracts).

114:127438b; Utsugi; published 1990 (Chemical Abstracts).

106:74703k; Avotins et al, published 1986 (Chemical Abstracts).

99:128943w; Cera, et al., published 1983 (Chemical Abstracts).

73:49110g; Pletyushkin et al, published 1970 (Chemical Abstracts).

50:10586i; Flament, published 1954 (Chemical Abstracts).

*Primary Examiner*—Wayne Langel

[57] ABSTRACT

An aqueous composition containing aluminum nitride powder which exhibits a reduced tendency for hydrolysis of the aluminum nitride contained therein. The aqueous composition comprises (a) a liquid medium containing water, (b) aluminum nitride powder, and (c) a combination of buffering agents which controls the pH of water from about 5.5 to about 7.5, wherein the combination of buffering agents is employed at a lower weight percent concentration than that of the aluminum nitride powder. In another embodiment of the invention, a method of processing aluminum nitride powder in water which exhibits a reduced tendency for hydrolysis of the aluminum nitride is disclosed, which method involves mixing the above-described aqueous composition.

20 Claims, No Drawings

METHOD FOR AQUEOUS PROCESSING OF ALN AND COMPOSITIONS THEREFROM

TECHNICAL FIELD

This invention relates generally to aqueous compositions containing aluminum nitride powder and methods of processing aluminum nitride in water. More specifically, this invention relates to aqueous compositions containing aluminum nitride powder and combinations of buffering agents and methods of using such compositions.

BACKGROUND OF THE INVENTION

Ceramic materials are used today in many applications which call for durable, tough, and heat-resistant materials. In making ceramic articles, a ceramic composite powder is often made by first wet mixing ceramic powder, such as aluminum nitride, with ceramic composite components, such as binders, lubricants, sintering aids, and other processing aids in a liquid medium.

Traditionally, when aluminum nitride powder is used as the ceramic powder, the wet mixing is performed using ethanol or some non-aqueous liquid as the liquid medium to aid in mixing. Water is generally not a suitable liquid medium for wet mixing with aluminum nitride powder because aluminum nitride is highly sensitive to hydrolysis. When aluminum nitride powder is hydrolyzed by water, undesirable aluminum hydroxides are formed on the powder, concomitant with an increased oxygen content.

However, due to environmental concerns, water would be an ideal liquid medium for wet mixing aluminum nitride powder with the other components. If water were to be used as the liquid medium, no precautions would need to be taken to avoid exposure to the liquid medium during wet mixing operations. Additionally, containment of the liquid medium and precautions to avoid the dangers of flammable liquids during and after mixing would not be necessary with water as it could be with other liquid mediums. Water also has the advantage of being relatively inexpensive and readily available.

It is a primary object of the present invention to provide aqueous compositions containing aluminum nitride powder which exhibit a reduced tendency for hydrolysis of the aluminum nitride contained therein and which may be comminuted, e.g., by ball-milling, without deleterious results.

It is also an object of the present invention to provide an easy method of processing aluminum nitride powder in water which exhibits a reduced tendency for hydrolysis of the aluminum nitride.

SUMMARY OF THE INVENTION

In accordance with preferred embodiments of the invention, these and other objects and advantages are addressed as follows. One embodiment of the invention concerns an aqueous composition containing aluminum nitride powder which exhibits a reduced tendency for hydrolysis of the aluminum nitride contained therein. The aqueous composition comprises (a) a liquid medium containing water, (b) aluminum nitride powder, and (c) a combination of buffering agents which controls the pH of water from about 5.5 to about 7.5, wherein the combination of buffering agents is employed at a lower weight percent concentration than that of the aluminum nitride powder.

Another embodiment of the invention concerns a method of processing aluminum nitride powder in water which method exhibits a reduced tendency for hydrolysis of the aluminum nitride. The method comprises mixing a composition which includes (a) a liquid medium containing water, (b) aluminum nitride powder, and (c) a combination of buffering agents which controls the pH of water from about 5.5 to about 7.5, wherein the combination of buffering agents is employed at a lower weight percent concentration than that of the aluminum nitride powder.

DETAILED DESCRIPTION OF THE INVENTION

The invention generally entails an aqueous composition containing aluminum nitride powder which exhibits a reduced tendency for hydrolysis of the aluminum nitride contained therein and methods using the aqueous composition. The aqueous composition comprises (a) a liquid medium containing water, (b) aluminum nitride powder, and (c) a combination of buffering agents which controls the pH of water from about 5.5 to about 7.5, wherein the combination of buffering agents is employed at a lower weight percent concentration than that of the aluminum nitride powder.

Examples of liquid mediums which may be used in the aqueous compositions of this invention are water or combinations of water and an alkyl alcohol having from 1-3 carbon atoms, inclusive, such as methanol, ethanol, and isopropyl alcohol.

With respect to the aluminum nitride powder employed in the aqueous compositions of this invention, there are no known limitations of the properties of the powder. The aluminum nitride powder may be employed at any level in the compositions of this invention; however, it is preferred that the aluminum nitride powder be employed in an amount which is at most about 60 weight percent of the composition, and more preferably, between about 10 and 30 weight percent of the composition.

To avoid having excessive undesirable compounds in the final aluminum nitride product, it is preferred that the combination of buffering agents be employed at a lower weight percent concentration than the aluminum nitride powder in the aqueous compositions of this invention. Therefore, if the aluminum nitride powder is employed in an amount which is at most about 60 weight percent of the composition, then the combination of buffering agents is employed in an amount which is less than 30 weight percent of the composition. Typically, the combination of buffering agents is employed in an amount less than 5 weight percent and, more typically, less than 1 weight percent of the composition.

The combination of buffering agents employed in this invention is a combination which controls the pH of water from about 5.5 to about 7.5, and preferably controls the pH from about 6 to about 7. A "combination of buffering agents" is a combination of compounds that when mixed in water in the proper proportion causes the water mixture to resist changes in pH on dilution or addition of acid or alkali. A combination of buffering agents includes a weak acid and a conjugate base of the weak acid, and the combination of buffering agents and the liquid medium form a solution. When a combination of buffering agents controls the pH of water at about 6 is employed in the compositions of this invention, the liquid medium, after being admixed with the aluminum nitride powder, usually has a pH of about 7. Therefore, using (a) a combination of buffering agents having a pH of about 6 and (b) water as the liquid medium provides for more manageable disposal of the liquid medium after use.

Typical ionic strengths of the combinations of buffering agents useful for this invention are from about 0.01 to about 6 mol/dm$^3$, more typical ionic strengths being from about 0.05 to about 0.1 mol/dm$^3$.

Combinations of buffering agents suitable for this invention include (i) a monobasic phosphate and a hydroxide selected from the group consisting of potassium hydroxide and sodium hydroxide, (ii) a monobasic phosphate and a dibasic phosphate, and (iii) an acetate and acetic acid.

More specifically, the monobasic phosphate may selected from the group consisting of monobasic potassium phosphate ($KH_2PO_4$), monobasic sodium phosphate ($NaH_2PO_4$), and monobasic ammonium phosphate ($NH_4H_2PO_4$). The dibasic phosphate may be selected from the group consisting of dibasic potassium phosphate ($K_2HPO_4$), dibasic sodium phosphate ($Na_4)_2HPO_4$), and dibasic ammonium phosphate (($NH_4)_2HPO_4$), and the acetate may selected from the group consisting of potassium acetate, sodium acetate, and ammonium acetate.

The monobasic/dibasic ammonium phosphate combination is a preferred combination of buffering agents because it works well in compositions employing substantially water as the liquid medium and it does not add any undesirable alkali metals to the compositions.

As mentioned hereinabove, the liquid medium may contain an alkyl alcohol. The alkyl alcohol may be employed in any amount. However, when the acetate and acetic acid are employed as the combination of buffering agents, it is preferred that the liquid medium contain at least 50 volume percent alcohol.

When the combination of the monobasic phosphate and the hydroxide is employed as the combination of buffering agents, the monobasic phosphate may be employed at a concentration from about 0.01 to about 2 molarity in the water portion of the liquid medium, and the hydroxide may be employed at a concentration from about 0.01 to about 1.0 molarity in the water portion of the liquid medium.

When the combination of the monobasic phosphate and the dibasic phosphate is employed, the monobasic phosphate may be employed at a concentration from about 0.01 to about 2 molarity in the water portion of the liquid medium, and the dibasic phosphate may be employed at a concentration from about 0.003 to about 0.7 molarity in the water portion of the liquid medium.

When combination of the acetate and the acetic acid is employed, the acetate may be employed at a concentration from about 0.02 to about 2.0 molarity in the water portion of the liquid medium, and the acetic acid may be employed at a concentration from about 0.002 to about 1.0 molarity in the water portion of the liquid medium.

When making the aqueous compositions of this invention, it is preferred to first dissolve the combination of buffering agents in the liquid medium and then add the aluminum nitride powder to the combination of buffering agents/liquid medium solution. To combine the aluminum nitride powder with the liquid medium before addition of the buffering agents would cause some undesirable hydrolysis of the aluminum nitride powder.

The compositions of this invention may be used in many of the techniques used in ceramic processing, such as tape-casting, slip casting, and filter casting. The compositions may even be used in methods in which comminuting occurs, e.g., during ball milling. During ball-milling, new, reactive surfaces of aluminum nitride are being formed; thus, ball milling is a severe test of the invention.

The aqueous compositions of this invention are also suitably used in methods which involve heating the compositions. The combination of buffering agents provides protection to the aluminum nitride powder even under refluxing conditions, i.e., conditions in which the liquid medium boils. Therefore, advantageously, the compositions of this invention can undergo heating in operations such as spray drying without significant hydrolysis of the aluminum nitride powder.

The compositions of this invention may be blended with other components which are commonly used in ceramic processing, such as binders, dispersants, and sintering aids. After mixing, the compositions are dried, optionally compacted and sintered.

The method of this invention involves processing aluminum nitride powder in water in which there is a reduced tendency for hydrolysis of the aluminum nitride. Basically, the method involves mixing the above-described composition of the invention. The mixing step may include comminuting or pulverizing the aluminum nitride powder.

One measure of the effectiveness of this invention on reducing the hydrolysis of aluminum nitride powder in water is the level of the oxygen content of the water-processed powders. The oxygen content of the water-processed aluminum nitride powder directly relates to the extent of hydrolysis. It has been found that when the compositions of this invention are dried and the resulting aluminum nitride powder is heat-treated at a 550°–600° C. temperature in a nitrogen atmosphere for one hour, the oxygen content of the heat-treated aluminum nitride powder is typically less than about 3 weight percent, often less than 2 weight percent.

Thus, there are provided, in accordance with the present invention, aqueous compositions containing aluminum nitride powder which exhibit a reduced tendency for the aluminum nitride powder to hydrolyze and which may be comminuted, e.g., by ball- milling, without deleterious results.

The following examples are illustrative only and should not be construed as limiting the invention which is properly delineated in the appended claims.

In the following examples, the aluminum nitride powder had a surface area of about 2.9 m$^2$/gm; 10% of the powder had a median particle size of about 0.5 microns; 50% of the powder had a median particle size of about 1.5 microns; 90% of the powder had a median particle size of about 3.8 microns; and the powder had an oxygen content of about 0.8 weight percent.

The water used in the following examples was filtered through a filtration system to give HPLC-grade water exhibiting a resistance on the order of 18 Mohm.

EXAMPLES

Comparative Examples

These examples illustrate the behavior of aluminum nitride powder in unbuffered water.

7.0 g aluminum nitride powder were mixed with 30 mL g unbuffered water and the mixture was stirred vigorously in an open vessel. Upon initial combination of the aluminum nitride powder and water, the pH of the mixture was about 7. The pH increased to over 9.5 within 3 hours of mixing and continued to increase to about 11 at about 21 hours of mixing.

In another comparative example, 7.0 g aluminum nitride powder was agitated in 30 ml water for 60 hours. After the agitation, the aluminum nitride powder was removed from the water and dried at 120° C. for 24 hours. The oxygen content of the dried aluminum nitride powder was 26.84 weight percent with a standard deviation of 1.18.

EXAMPLE 1

7 g of aluminum nitride powder were added to a mixture of 20 ml of water and 10 ml of a pH 6 solution containing 0.025M monobasic potassium phosphate and 0.025M dibasic sodium phosphate in water. The aluminum nitride/water/buffering agents combination was then vigorously stirred in an open vessel for 48 hours with the pH of the dispersion measured periodically. The pH of the dispersion remained relatively stable over the 48 hours, ending with a pH of about 7. The aluminum nitride powder was then removed from the water/buffer solution and dried at 120° C. for 24 hours. The oxygen content of the dried powder was 1.117 weight percent with a standard deviation of 0.069. The dried powder was then exposed to 550° C. in a nitrogen atmosphere for one hour. The oxygen content of the powder after this exposure was 0.939 weight percent with a 0.066 standard deviation.

EXAMPLE 2

70.0 g. aluminum nitride powder was admixed into 300 ml of a 0.07M monobasic ammonium phosphate/0.01M dibasic ammonium phosphate solution in water having an ionic strength of 0.10 mol/dm$^3$ and a pH of 5.990 at 21° C. The aluminum nitride powder/water/buffering agents mixture was then vigorously stirred in an air atmosphere. After 48 hours of stirring, the mixture exhibited less than a 0.5 pH increase, indicating very little hydrolysis of the aluminum nitride powder. The aluminum nitride powder was then separated from the liquid medium, dried at 120° C. for 72 hours and heat-treated at 550° in a nitrogen atmosphere for one hour. The oxygen content of the dried and heat-treated powder was measured to be 1.471 weight percent with a standard deviation of 0.122.

EXAMPLE 3

This example illustrates that the present invention enables aluminum nitride powder to be ball-milled in aqueous compositions.

A high-density polyethylene bottle was charged with about 200 ml aluminum nitride milling media, 65 ml of a solution containing 0.070M monobasic ammonium phosphate and 0.010M dibasic ammonium phosphate in water, and 16.0 g aluminum nitride powder. After 24 hours of ball-milling, the mixture was passed through a 60 mesh screen to remove the milling media. The aqueous medium was decanted from the remaining mixture, and the resulting powder was dried at 120° C. for at least 24 hours. The oxygen content of the powder dried at 120° C. was 3.310 weight percent with a standard deviation of 0.496. The dried powder was then heat-treated at 550° C. in a nitrogen atmosphere for one hour. The oxygen content of the heat-treated powder was 2.555 weight percent with a standard deviation of 0.379.

A comparative experiment was performed in which no water was present in the milling mixture to determine the oxygen content of the resultant aluminum nitride powder contributed by the milling media. The oxygen content of aluminum nitride powder ball-milled in absolute ethanol, dried, and subsequently exposed to 550° C. in a nitrogen atmosphere was determined to have an oxygen content of 1.0098 weight percent with a standard deviation of 0.0150.

EXAMPLE 4

Example 3 was repeated except, in place of the monobasic/dibasic ammonium phosphate buffer solution, 65 ml of an ethanol/water solution (95 volume % ethanol) was used in which the water was buffered with 1.0M ammonium acetate and 0.055M acetic acid. As in the Example 3, the resulting powder was exposed to 550° C. in a nitrogen atmosphere. The oxygen content of this powder was 1.228 weight percent with a standard deviation of 0.094.

Comparatively, aluminum nitride powder was ball-milled for 24 hours in a 95 volume % ethanol/5 volume % water solution without including a combination of buffering agents. Upon exposing the resulting aluminum nitride powder to 550° C. in a nitrogen atmosphere, the oxygen content of the powder was 7.068 weight percent with a standard deviation of 0.248.

EXAMPLE 5

15 ml of a solution comprising 0.5M monobasic ammonium phosphate and 0.165M dibasic ammonium phosphate in water having an ionic strength of 1.0 mol/dm$^3$ is diluted with 15 ml water. 15 ml of the diluted solution was added to 285 ml of absolute ethanol, resulting in a solution containing 95 volume percent ethanol and 5 volume percent water. 70 g aluminum nitride powder was then added to the ethanol/water solution and stirred for 72 hours. The powder was then separated from the ethanol/water solution, dried at 110°-120° C., and heat-treated at 550° C. in a nitrogen atmosphere for one hour. The oxygen content of the heat-treated powder was measured to be 1.23 weight percent.

Comparatively, 70 g aluminum nitride powder was stirred for 72 hours in 300 ml of a solution containing 95 volume percent ethanol and 5 volume percent water. The powder was then separated from the ethanol/water solution and heat-treated at 550° C. for one hour. The oxygen content of the heat-treated powder was measured to be 5.11 weight percent.

EXAMPLE 6

70 g aluminum nitride power was stirred in 300 mL refluxing water which was buffered with 0.07M monobasic ammonium phosphate and 0.01M dibasic ammonium phosphate for 24 hours in an open air atmosphere. After 24 hours of refluxing, the aluminum nitride powder was dried at 120° C. The dried powder had a measured oxygen content of 2.187 weight percent with a 0.254 standard deviation. The dried powder was then heat-treated at 550° C. in a nitrogen atmosphere for one hour. The heat-treated powder had an oxygen content of 2.665 weight percent with a 0.440 standard deviation.

While my invention has been described in terms of a specific embodiment, it will be appreciated that other embodiments could readily be adapted by one skilled in the art. Accordingly, the scope of my invention is to be limited only by the following claims.

What is claimed is:

1. An aqueous composition containing aluminum nitride powder which exhibits a reduced tendency for hydrolysis of the aluminum nitride contained therein, comprising:
   (a) a liquid medium containing water,
   (b) aluminum nitride powder, and
   (c) a combination of buffering agents including a weak acid and a conjugate base of the weak acid which controls the pH of water from about 5.5 to no greater than 7.0, the combination of buffering agents being employed at a lower weight percent concentration than the of the aluminum nitride powder and the buffering agents and the liquid medium forming a solution in the aqueous composition.

2. The composition as claimed in claim 1 wherein the pH of the combination of buffering agents in water is from about 6 to no greater than 7.

3. The composition as claimed in claim 1, wherein the aluminum nitride powder is employed in an amount of at most about 60 weight percent of the composition.

4. The composition as claimed in claim 1, wherein the aluminum nitride powder is employed in an amount from about 10 to about 30 weight percent of the composition.

5. The composition as claimed in claim 1, wherein when the composition is dried and the resulting dried aluminum nitride powder is exposed to a 550°–600° C. temperature in a nitrogen atmosphere for one hour, the oxygen content of the dried aluminum nitride powder is less than about 3 weight percent.

6. The composition as claimed in claim 1, wherein the combination of buffering agents is selected from combinations consisting of (i) a monobasic phosphate and a hydroxide selected from the group consisting of potassium hydroxide and sodium hydroxide, (ii) a monobasic phosphate and a dibasic phosphate, and (iii) an acetate and acetic acid.

7. The composition as claimed in claim 6, wherein the monobasic phosphate is selected from the group consisting of monobasic potassium phosphate, monobasic sodium phosphate, and monobasic ammonium phosphate, the dibasic phosphate is selected from the group consisting of dibasic potassium phosphate, dibasic sodium phosphate, and dibasic ammonium phosphate, and the acetate is selected from the group consisting of potassium acetate, sodium acetate, and ammonium acetate.

8. The composition as claimed in claim 6, wherein the combination of the monobasic phosphate and the hydroxide is employed, the monobasic phosphate being employed at a concentration from about 0.01 to about 2 molarity in the water and the hydroxide being employed at a concentration from about 0.01 to about 1.0 molarity in the water.

9. The composition as claimed in claim 6, wherein the combination of the monobasic phosphate and the dibasic phosphate is employed, the monobasic phosphate being employed at a concentration from about 0.01 to about 2 molarity in the water and the dibasic phosphate being employed at a concentration from about 0.003 to about 0.7 molarity in the water.

10. The composition as claimed in claim 6, wherein the combination of the acetate and the acetic acid is employed, the acetate being employed at a concentration from about 0.02 to about 2.0 molarity in the water and the acetic acid being employed at a concentration from about 0.002 to about 1.0 molarity in the water.

11. An aqueous composition containing aluminum nitride powder which exhibits a reduced tendency for hydrolysis of the aluminum nitride contained therein, comprising:
   (a) water,
   (b) aluminum nitride powder, and
   (c) a combination of buffering agents including a weak acid and a conjugate base of the weak acid, the combination of buffering agents being employed at a lower weight percent concentration than that of the aluminum nitride powder, the buffering agents and the water forming a solution in the aqueous composition the combination of buffering agents including a monobasic phosphate and a dibasic phosphate, the monobasic phosphate being selected from the group consisting of monobasic potassium phosphate, monobasic sodium phosphate, and monobasic ammonium phosphate and being employed at a concentration from about 0.01 to about 2 molarity in the water, the dibasic phosphate being selected from the group consisting of dibasic potassium phosphate, dibasic sodium phosphate, a dibasic ammonium phosphate and being employed at a concentration from about 0.003 to about 0.7 molarity in the water.

12. A method of processing aluminum nitride powder in water which exhibits a reduced tendency for hydrolysis of the aluminum nitride, comprising mixing a composition which includes:
   (a) a liquid medium containing water,
   (b) aluminum nitride powder, and
   (c) a combination of buffering agents including a weak acid and a conjugate base of the weak acid which controls the pH of water from about 5.5 to no greater than 7.0, the combination of buffering agents being employed at a lower weight percent concentration than that of the aluminum nitride powder and the buffering agents and the liquid medium forming a solution in the aqueous composition.

13. The method as claimed in claim 12, wherein the mixing includes comminuting the aluminum nitride powder.

14. The method as claimed in claim 12, wherein the pH of the combination of buffering agents in water is from about 6 to no greater than 7.

15. The method as claimed in claim 12, wherein the aluminum nitride powder is employed in an amount of at most about 60 weight percent of the composition.

16. The method as claimed in claim 12, wherein the aluminum nitride powder is employed in an amount from about 10 to about 30 weight percent of the composition.

17. The method as claimed in claim 12, further comprising drying the mixed composition resulting in dried aluminum nitride powder which when exposed to a 550°–600° C. temperature in a nitrogen atmosphere for one hour has an oxygen content of less than about 3 weight percent.

18. The method as claimed in claim 12, wherein the combination of buffering agent is selected from combinations consisting of (i) a monobasic phosphate and a hydroxide selected from the group consisting of potassium hydroxide and sodium hydroxide, (ii) a monobasic phosphate and a dibasic phosphate, and (iii) an acetate and acetic acid.

19. The method as claimed in claim 12, further comprising heating the composition.

20. A method of processing aluminum nitride powder in water which exhibits a reduced tendency for hydrolysis of the aluminum nitride, comprising mixing and comminuting a composition which includes:
 (a) a water,
 (b) aluminum nitride powder, and
 (c) a combination of buffering agents including a weak acid and a conjugate base of the weak acid, the combination of buffering agents being employed at a lower concentration than that of the aluminum nitride powder, the buffering agents and the water forming a solution in the aqueous composition the combination of buffering agents including a monobasic phosphate and a dibasic phosphate, the monobasic phosphate being selected from the group consisting of monobasic potassium phosphate, monobasic sodium phosphate, and monobasic ammonium phosphate and being employed at a concentration from about 0.01 to about 2 molarity in the water, the dibasic phosphate being selected from the group consisting of dibasic potassium phosphate, dibasic sodium phosphate, and dibasic ammonium phosphate and being employed at a concentration from about 0.003 to about 0.7 molarity in the water.

* * * * *

UNITED STATES PATENT AND TRADEMARK OFFICE
CERTIFICATE OF CORRECTION

PATENT NO. : 5,234,676
DATED : August 10, 1993
INVENTOR(S) : Kevin E. Howard

It is certified that error appears in the above-identified patent and that said Letters Patent is hereby corrected as shown below:

Column 8:

Claim 11, line 25 should correctly read --- phosphate, and dibasic ---.
Claim 18, line 63 should correctly read --- combination of buffering agents is ---.

Signed and Sealed this

Thirty-first Day of May, 1994

Attest:

Attesting Officer

BRUCE LEHMAN

Commissioner of Patents and Trademarks